United States Patent
Keithley

(10) Patent No.: US 8,837,014 B1
(45) Date of Patent: *Sep. 16, 2014

(54) METHOD AND APPARATUS FOR REDUCING COLOR IN A FRINGE

(71) Applicant: Marvell International Ltd., Hamilton (BM)

(72) Inventor: Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,000

(22) Filed: Nov. 7, 2013

Related U.S. Application Data

(63) Continuation of application No. 13/181,419, filed on Jul. 12, 2011, now Pat. No. 8,582,187.

(60) Provisional application No. 61/365,246, filed on Jul. 16, 2010.

(51) Int. Cl.
  *H04N 1/04* (2006.01)
  *H04N 1/48* (2006.01)

(52) U.S. Cl.
  CPC ............................ *H04N 1/48* (2013.01)
  USPC ............ 358/474; 358/475; 358/509; 382/275

(58) Field of Classification Search
  CPC ............... H04N 9/3197; H04N 2201/0081; H04N 1/6027; H04N 2201/3252; H04N 5/2351; H04N 5/335; H04N 1/40012; H04N 1/60; H04N 1/6077; H04N 2201/33328; H04N 9/3164
  USPC .......... 358/509, 475, 474, 501; 382/131, 162, 382/165, 167, 173, 176, 187, 199, 245, 254, 382/266, 269, 275, 284, 313, 317
  See application file for complete search history.

(56) References Cited

U.S. PATENT DOCUMENTS

| | | | |
|---|---|---|---|
| 4,811,047 A | | 3/1989 | Hosaka et al. |
| 5,459,589 A | * | 10/1995 | Ohnishi et al. ................ 358/518 |
| 5,686,960 A | | 11/1997 | Sussman et al. |
| 5,717,790 A | * | 2/1998 | Kanesaka et al. ............ 382/274 |
| 5,805,312 A | * | 9/1998 | Ozawa et al. ................. 358/503 |
| 5,841,451 A | | 11/1998 | Hirabayashi et al. |
| 6,567,570 B1 | | 5/2003 | Steinle et al. |
| 7,327,498 B2 | * | 2/2008 | Hakamada .................... 358/474 |
| 7,422,205 B2 | | 9/2008 | Akiyama et al. |
| 7,477,431 B2 | * | 1/2009 | Kinumura ..................... 358/514 |
| 7,751,095 B2 | * | 7/2010 | Suzuki et al. ................. 358/474 |
| 7,852,551 B2 | | 12/2010 | Hara et al. |
| 7,864,386 B2 | * | 1/2011 | Tanimoto et al. ............ 358/496 |
| 7,929,610 B2 | | 4/2011 | Sun |

(Continued)

OTHER PUBLICATIONS

"Non-Final Office Action", U.S. Appl. No. 13/181,419, Apr. 9, 2013, 7 pages.

(Continued)

*Primary Examiner* — Negussie Worku

(57) ABSTRACT

This disclosure describes techniques and apparatuses for reducing color fringes. In some embodiments, inaccuracies from color-insensitive sensors are corrected. Inaccuracies can be corrected in part by shortening a first illumination made temporally proximate a second illumination. By so doing, a center of the image captured for a first illumination is moved toward the image captured for a second illumination, which reduces a color fringe.

20 Claims, 8 Drawing Sheets

(56) References Cited

U.S. PATENT DOCUMENTS 8,130,423 B2 * 3/2012 Nakano et al. ............... 358/474
8,149,465 B2 * 4/2012 Maki .......................... 358/3.27
8,335,023 B2   12/2012 Tsukahara
8,582,187 B1 * 11/2013 Keithley ...................... 358/509

OTHER PUBLICATIONS

"Notice of Allowance", U.S. Appl. No. 13/181,419, Jul. 10, 2013, 8 pages.

* cited by examiner

METHOD AND APPARATUS FOR REDUCING COLOR IN A FRINGE

RELATED APPLICATION

This application claims priority to U.S. Utility patent application Ser. No. 13/181,419 filed Jul. 12, 2011 which claims priority to U.S. Provisional Patent Application No. 61/365,246 filed Jul. 16, 2010, the disclosures of which are incorporated by reference herein in their entirety.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Contact image sensor (CIS) devices generally include an array of sensors and an illuminator. The array of sensors typically cannot differentiate between colors. Even so, CIS devices can be used to scan media, such as a sheet of paper having text, and determine that colors are present on the media. To do so, the illuminator illuminates the media with primary colors one at a time, such as first with red, then with green, and then with blue. During each color illumination, the CIS sensors detect reflected photons but not their color. Because the device's controller knows which color is being illuminated for each set of detections, the controller can determine which colors are on the media.

CIS devices, however, move relative to the media and often can only do so once. When a sheet of paper is fed through a copier, for example, the sheet of paper is scanned by a CIS device with one, single pass. Because of this, the CIS sensors cannot detect all three primary colors at same locations on the paper. Instead, the colors are illuminated and sensed in succession for each scan line. A scan line is generally $\frac{1}{600}^{th}$ of an inch and there are typically three colors used. Thus, for each third of $\frac{1}{600}^{th}$ of an inch of the media, a different color is being sensed. This can result in inaccurate scans.

Consider a case where a white sheet of paper having black text is being scanned. If the illuminator is illuminating the paper with red at the transition between the white and the black, and thus on the last bit of white paper before the black text starts, the CIS sensors will detect reflected photons, which the CIS controller will interpret as red. The illuminator then proceeds to illuminate with green, which is absorbed by the black text, in response to which the CIS sensors do not detect reflected photons. The same is true for the blue that follows next, and then the red following thereafter, and so forth until the black text ends. Thus, in this example, a red-colored fringe is sensed at the white-to-black transition. Conventional CIS devices suffer from this and various other inaccuracies, which can result in a copier printing a page with a color fringe that is not present on the original. Not only is this inaccurate, it also can substantially increase costs and copying times.

SUMMARY

This Summary is provided to introduce a selection of concepts in a simplified form that are further described below in the Detailed Description.

A controller embodiment is described, the controller configured to control an illuminator of a contact-image sensor (CIS) device having sensors and the illuminator, the illuminator capable of illumination with first, second, and third colors and the controller configured to cause the illuminator to illuminate media with the first color for a first period less than one third of a scan period in which a scan line is scanned by the CIS device, the scan period based on a relative movement between the media and the sensors used to scan the scan line and illuminate the media with the second color temporally proximate illuminating with the first color, the temporal proximity smaller than one third of the scan period.

A method embodiment is described, the method including blurring a middle image of three images, the three images having two outside images and the middle image, the blurring of the middle image reducing a color fringe present in a composite image having the blurred, middle image aligned with the two outside images but increasing a blurring of the composite image and sharpening the composite image to reduce the blurring of the composite image.

An apparatus embodiment is described, the apparatus including a controller configured to cause an illuminator of a contact image sensor (CIS) device having sensors to illuminate media with three primary colors during a scan period in which a scan line is scanned by the sensors of the CIS device, the illuminating delaying illumination of the first color past a start of the scan period and ending illumination of the third color before the end of the scan period effective to cause a first center of a first image captured during illumination of the first color and a third center of a third image captured during illumination of the third color to be closer to a second center of a second image captured during illumination of the second color than one-third of the scan period. The apparatus also includes a pre-processor configured to align the first image and the third image with the second image, the aligning the first image and the third image blurring the first image and the third image, and blur the second image effective to reduce a color fringe present in a composite image having the blurred, second image aligned with the first and third images but blurring the composite image. Further, the apparatus includes a post-processor configured to sharpen the composite image to reduce the blurring of the composite image.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques and apparatuses for scanning media with color-insensitive sensors often result in color fringes and other inaccuracies. This disclosure describes techniques and apparatuses for reducing some of these inaccuracies when using color-insensitive sensors, such as some contact image sensing devices.

The following discussion describes an operating environment, techniques that may be employed in the operating environment, and a System-on-Chip (SoC) in which component(s) of the operating environment can be embodied. In the discussion below, reference is made to the operating environment by way of example only.

Operating Environment

Figure 1:
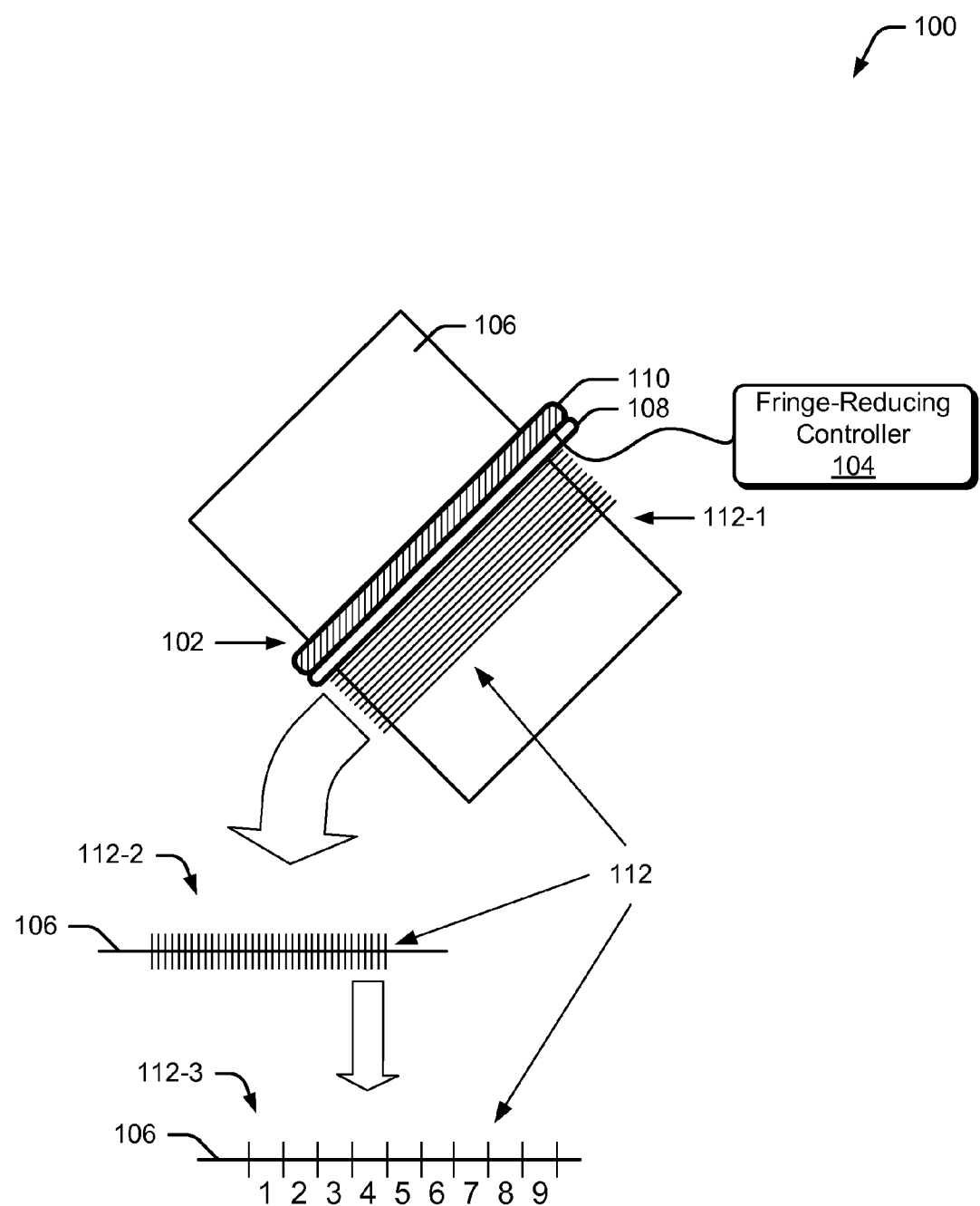
FIG. 1 illustrates an operating environment having a contact image sensing device and a fringe-reducing controller in accordance with one or more embodiments.

FIG. 1 illustrates an operating environment 100 having a contact image sensor (CIS) device 102, a fringe-reducing controller 104, and paper or other media 106. CIS device 102 includes an array of sensors 108 and an illuminator 110, both of which move relative to media 106. Here media 106 is mechanically advanced at an approximately constant speed under sensors 108 and illuminator 110, though CIS device 102 may instead be moved and media 106 remain fixed. The approximately constant speed at which media 106 is advanced may have some variation or velocity ripple.

CIS device 102 includes sensors 108 and illuminator 110, and is controlled at least in part by fringe-reducing controller 104. Sensors 108 are incapable of differentiating colors with sufficient reliability and accuracy for scanning colors potentially present on media 106. Illuminator 110 is capable of illuminating media 106 with various colors, such as primary colors red, green or yellow, and blue, though other colors may also or instead be used. Sensors 108 sense reflected photons illuminated on media 106 by illuminator 110. Controller 104 can determine colors present on media 106 based on the color illuminated during the time at which sensors 108 sense the reflected photons.

FIG. 1 also illustrates scan lines 112 in various views, view 112-1 showing scan lines in a top-down view on media 106, view 112-2 showing scan lines at a cross-sectional view, and view 112-3 showing nine scan lines in cross section and expanded for detail. For each scan line, illuminator 110 illuminates media 106 with three colors one-at-a-time as media 106 moves relative to sensors 108. The size of each scan line is related to a scan period, which is an amount of time that sensors 108 pass over each scan line of media 106. As will be discussed in greater detail below, controller 104 may cause illuminator 110 to illuminate the media of each scan line for less than the scan period.

Figure 2:
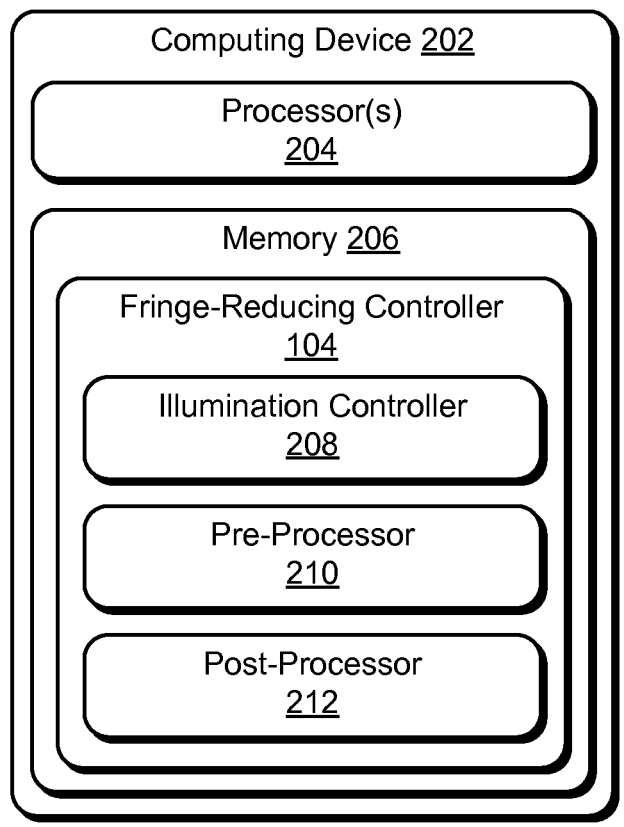
FIG. 2 illustrates an embodiment of the fringe-reducing controller of FIG. 1.

FIG. 2 is an illustration of a computing device 202 having an example embodiment of fringe-reducing controller 104. Device 202 includes one or more processors 204 and computer-readable storage memory ("memory") 206. Memory 206 includes fringe-reducing controller 104, which includes or has access to one or more of an illumination controller 208, a pre-processor 210, and a post-processor 212. As noted, fringe-reducing controller 104 can control, and/or process data from, CIS device 102 effective to reduce color fringes. In this example embodiment, controller 104 acts through illumination controller 208 to control illuminator 110 and/or pre-processor 210 to receive and process data from sensors 108 to reduce color fringes or alters the data to better enable post-processor 212 to reduce color fringes. Generally, post-processor 212 performs other processing on data received from pre-processor 210, such as to sharpen images.

By way of example, illumination controller 208 can be configured to cause illuminator 110 to illuminate media 106 with three primary colors during a scan period in which a scan line moves relative to sensors 108 of CIS device 102 but delay illumination of the first color past a start of the scan period and end illumination of the third color before the end of the scan period. This is but one way in which controller 104 can move centers of images being sensed closer together, which effectively reduces color fringes.

By way of another example, pre-processor 210 can be configured to align images received from sensors 108, such as aligning an outer red image and an outer blue image with a middle green image. This aligning is useful to reduce an amount of color of a color fringe, but can blur a composite of the three images, which is not generally desired. Pre-processor 210, however, can blur the middle image, which counterintuitively can increase the quality of the composite image after post-processing by post-processor 212.

Ways in which entities of FIGS. 1 and 2 act and interact are set forth in greater detail below. The entities illustrated can be separate or integrated to the extent permitted by the techniques described herein, such as illumination controller 208, pre-processor 210, and post-processor 212 being integral or separate from each other and controller 104. These entities are shown as computer-executable instructions executable by processor(s) 204, but may instead be hardware or firmware, or a combination of hardware, firmware, and/or software.

Example Techniques for Reducing a Color Fringe

The following discussion describes example techniques for reducing a color fringe. These techniques can be implemented utilizing the previously described environment, such as controller 104 of FIG. 1. These techniques include methods illustrated in FIGS. 5 and 7, each of which is shown as a set of operations performed by one or more entities. These methods are not necessarily limited to the orders shown for performing the operations.

Figure 3:
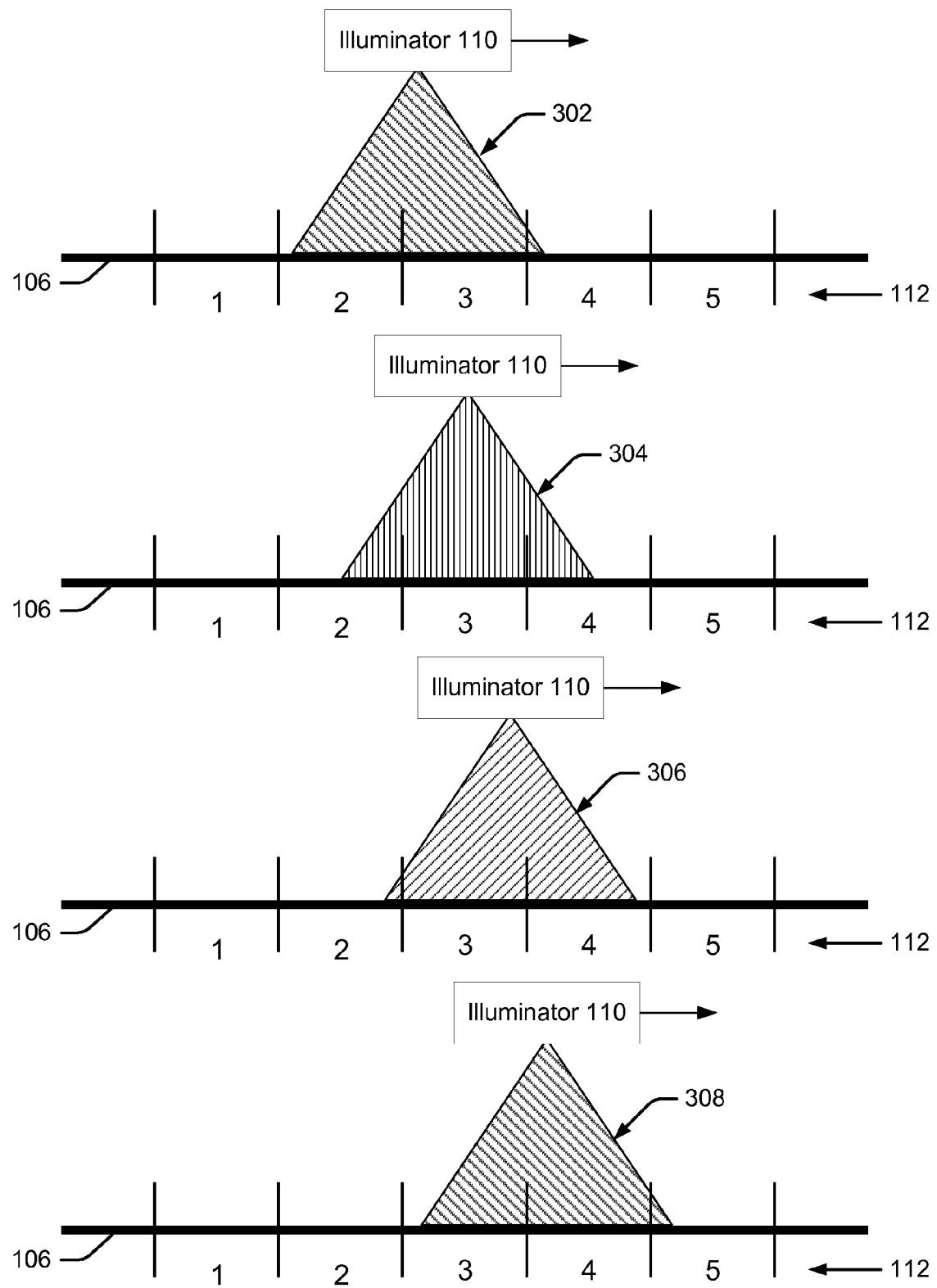
FIG. 3 illustrates the illuminator of FIG. 1 illuminating media with four separate illuminations.
Figure 4:
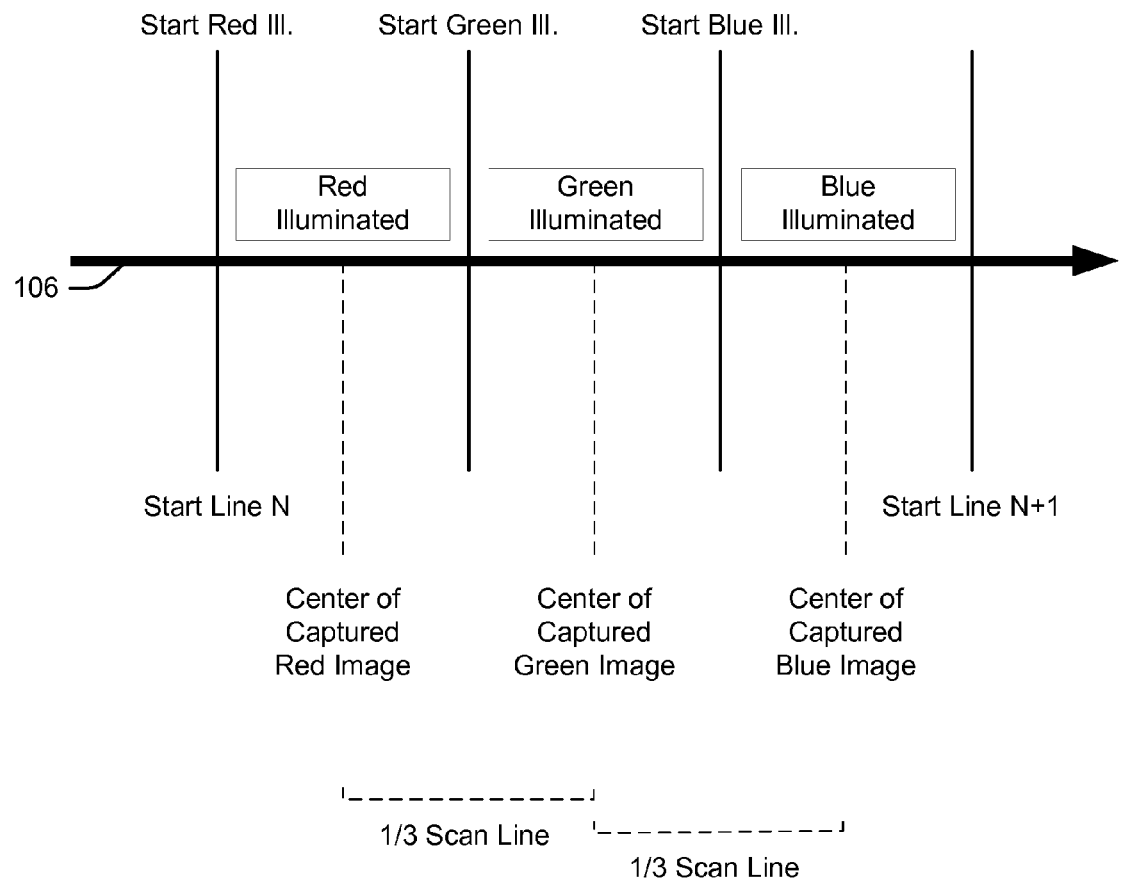
FIG. 4 illustrates centers of three of the illuminations of FIG. 3.
Figure 5:
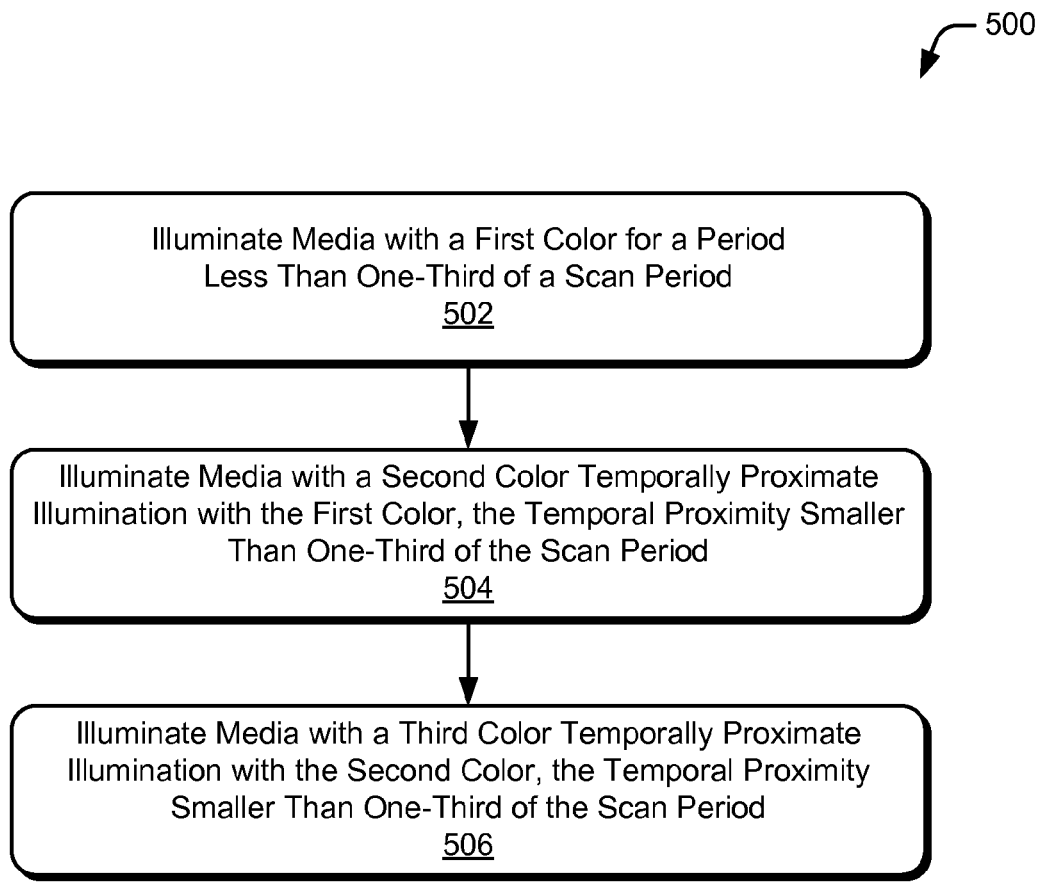
FIG. 5 illustrates an example method for illuminating media effective to reduce a color fringe.

Before describing FIG. 5, consider FIGS. 3 and 4 as illustrative of illuminations made that are about one-third of a scan period. FIG. 3 illustrates illuminator 110 illuminating media 106 with four separate illuminations 302, 304, 306, and 308. The first three illuminations are made over scan line number "3" of five scan lines 112 of FIG. 1. Note that illuminator 110 moves from left to right at a constant velocity in which the scan lines are scanned. While shown with only five scan lines, each scan line is often very small, such as 1/600 of an inch wide. Illuminator 110 performs three separate illuminations 302, 304, and 306 and sensors 108 perform three accompanying reads for each scan line.

In this case the CIS device 102 (shown with just illuminator 110) will move 1/3 of a scan line (1/1,800 inch) during illumination 302. Likewise, for illumination 304, CIS device 102 will move another 1/3 of a scan line. Finally, for illumination 306, CIS device 102 will move a final 1/3 of a scan line. During these three sequential color illuminations and reads, CIS device 102 moves one full scan line. The process begins again with illumination 308 to illuminate and read scan line "4".

As illustrated in FIG. 4, three of these illuminations 302, 304, and 306 result in centers of the captured images that are about 1/3 of a scan line apart. For this reason, color fringes can be as much as about 1/3 of a scan line in width.

FIG. 5 depicts a method 500 for illuminating media effective to reduce a color fringe. At 502, media is illuminated with a first color for a first period, the first period less than one-third of a scan period in which a scan line is scanned, the scan period based on a relative movement between the media and sensors scanning the scan line.

Figure 6:
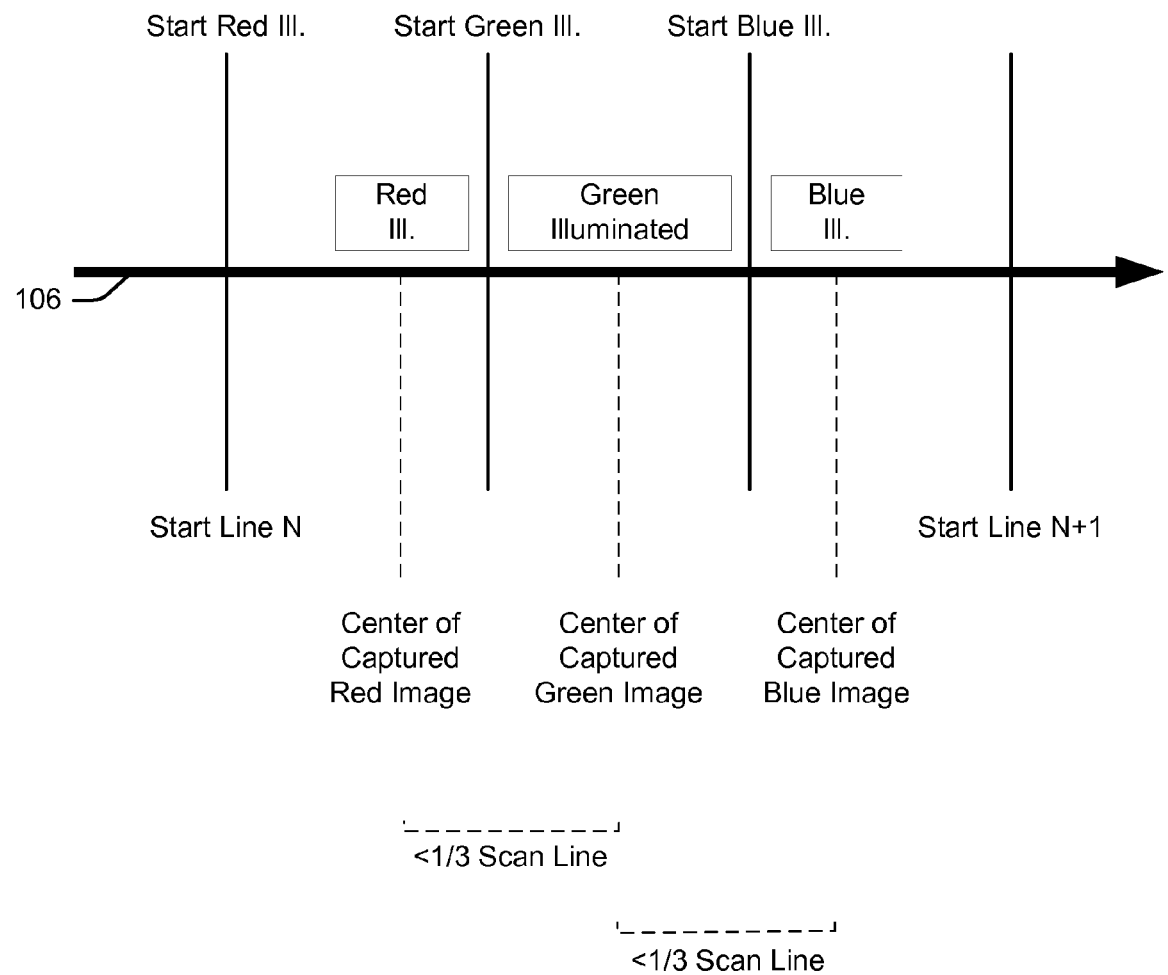
FIG. 6 illustrates centers of illuminations corresponding to an embodiment of the method of FIG. 5.

This first illumination is shortened and made temporally proximate a second illumination, which is effective to move a center of the image captured for a first illumination toward the image captured for a second illumination. This is illustrated in FIG. 6. Contrasted with FIG. 4, in FIG. 6 color fringes are reduced, in this case by about 25 percent by beginning a first illumination at 0.167 of line N instead of about 0.0 of line N and ending a third illumination at about 0.833 of line N instead of about 1.0 of line N. In another case, color fringes may be reduced by about 19 percent by beginning a first illumination at 0.125 of line N instead of about 0.0 of line N and ending a third illumination at about 0.875 of line N instead of about 1.0 of line N.

At 504, media is illuminated with a second color temporally proximate illumination with the first color, the temporal proximity smaller than one-third of the scan period. This is illustrated in FIG. 6 as well, which shows that the start of the green illumination is made physically near to the first illumination of 502 due to the temporally proximity. In some cases, adjusting the temporal proximity of the illumination with the second color with that of the illumination with the first color is effective to cause the spacing of centers of captured images to be less than ⅓ of a scan line apart.

At 506, media is illuminated with a third color temporally proximate illuminating with the second color, the temporal proximity smaller than one-third of the scan period and for a third period, the third period less than one third of the scan period. Again, an example of method 500 is illustrated in FIG. 6, which shows the center of the blue image moved toward the center of the green image. In some cases, adjusting the temporal proximity of the illumination with the third color with that of the illumination with the second color is effective to cause the spacing of centers of captured images to be less than ⅓ of a scan line apart.

Note that the second illumination is illustrated in FIG. 6 having an illumination of less than about ⅓ of a scan period, though this may be larger or smaller than ⅓ of the scan period. In the context of the present example, the illumination is about ¼ of the scan period. In cases of higher levels of illumination, the spacing is as low as ⅙ of a scan period which may reduce fringe by about 50 percent.

As noted above, method 500 can be performed by controller 104, including through illumination controller 208 causing illuminator 110 to perform actions at 502, 504, and/or 506. By so doing, color fringes can be reduced. In some cases a color fringe caused by a white-to-black color transition in a scan line can be reduced by about 25 or more percent.

Methods 500 and 700 can be performed alone or in conjunction with other methods and techniques set forth herein, including with each other. For example, method 500 is effective to reduce a color fringe without combination with method 700 and likewise method 700 is effective to reduce a color fringe without combination with method 500. If combined, however, additional reduction in a color fringe can result over performance of just one method or the other. In one example described below, captured images corresponding to the illumination and reads of method 500 are received and pre-processed by method 700.

Figure 7:
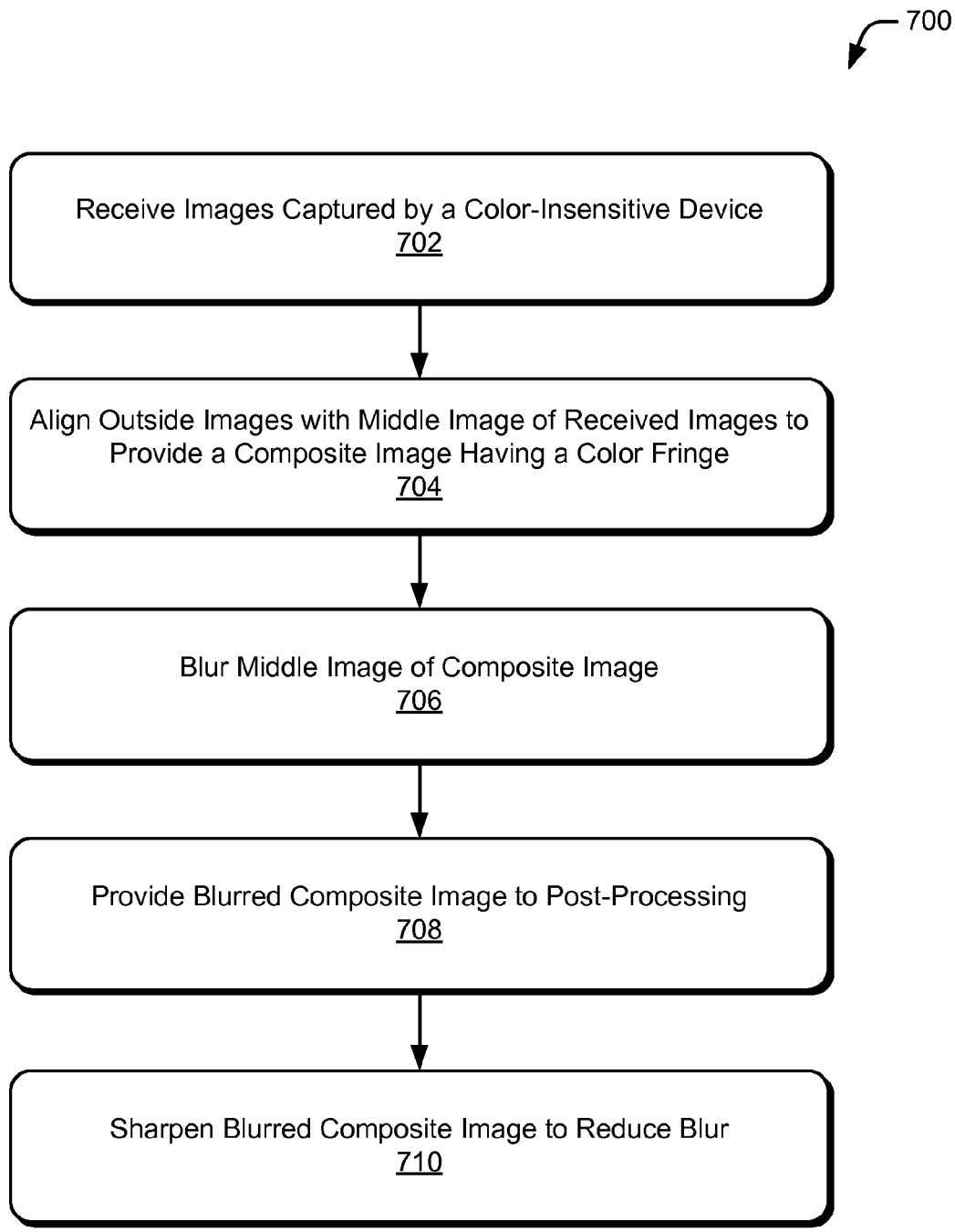
FIG. 7 illustrates an example method for pre-processing received images to reduce a color fringe.

FIG. 7 depicts a method 700 for pre-processing received images effective to reduce a color fringe. As noted in part above, for each illumination, a read of the media can be performed. Each read captures an image, and thus each image corresponds to the illumination, including the period and timing of the illumination. Thus, whether as a product of captured images corresponding to FIG. 4, or instead to method 500 and FIG. 6, captured images correspond to illuminations and reads and can be pre-processed to reduce a color fringe.

At 702, images captured by a color-insensitive device are received. These images may include various colors described above, though this method is described in the context of three images corresponding to three primary colors. Further, these three images have two outside images and one middle image, such as outside images of red and blue and a middle image of green shown in FIGS. 4 and 6. These colors and arrangements are not required but are used as examples only.

The received images are misaligned. This can be caused by a relative speed of movement between media being scanned and a scanner of the media, the images corresponding to different regions of a scan line caused by the movement. Thus, a first of the two outside images is offset from the middle image by one line-color spacing and a second of the two outside images offset from the middle image by another line-color spacing. These line-color spacings are shown in FIGS. 4 and 6 as about ⅓ or less than about ⅓ of a scan line, respectively.

By way of example, assume that pre-processor 210 receives a red, green, and blue image captured by CIS device 102 being controlled by fringe-reducing controller 104 and having line-color spacings of about ¼ of a scan line. Further, assume that the images are received as three incoming pixels for each column of a scan line having a row of pixels three pixels wide (red, green, blue) and having many thousands of pixels deep. Although shown in the following pixel sequences of red, green, and blue, the order of arrival is arbitrary and may be configured differently as depending on an imaging system in which the method(s) are implemented. Also assume that pixels from immediately preceding scan lines (rows) are retained. Thus, for a first red pixel of a first scan line being R1, a first green pixel from the first scan line being G1, and etc. to a third blue pixel received for a third can line being B3. These pixels are received:

R1, G1, B1 from row 1
R2, G2, B2 from row 2
R3, G3, B3 from row 3

At 704, outer images of the received images are aligned with a middle image to provide a composite image having a color fringe. In the current example, the red and blue images are shifted ¼ of a scan line to provide a composite image of all three images. Aligning images will reduce the color fringe but often creates a blur of the outer images (because both were shifted). This is often considered a negative effect of alignment. Continuing the detailed example, a new center pixel is calculated with shifted color values below:

$R2' = (¾)R2 + (¼)R3$
$G2' = G2$
$B2' = (¾)B2 + (¼)B1$

At 706, a middle image of the composite image is blurred. As noted, the three images include two outside images and the middle image, but the outside images are blurred as an effect of aligning at 704. Continuing the ongoing embodiment, pre-processor 210 blurs the green image, in some cases by about a same amount of blurring as is present in the red and blue images caused by the aligning.

In this case, the green image is blurred:

$$R2' = (¾)R2 + (¼)R3$$

$$G2' = (¾)G2 + (⅛)G1 + (⅛)G3$$

$$B2' = (¾)B2 + (¼)B1$$

While blurring the middle image does further blur the fringes of the composite image, it reduces the amount of color present in the fringe. This blurring can be corrected by post-processing resulting in a sharper image after post processing even though the composite image is more blurred because the reduction in color at the color fringe has a greater positive effect than the blurring.

At 708, the blurred composite image is provided to post-processing. In the present example the blurred composite image is provided internal to fringe-reducing controller 104 from pre-processor 210 to post-processor 212. In some case, however, a post-processing entity is separate from controller 104 and/or pre-processor 210.

At 710, the blurred composite image is sharpened to reduce the blurring of the composite image. Here post-processor 212 performs sharpening and other post-processing effective to sharpen and make the image ready for further use (e.g., copying onto other media).

Detailed Example for Image Pipeline of 20 Rows by 5120 Columns By way of further example, consider method 700 in the context of images processed in columns for horizontal images having strip sizes of 20 rows and 5120 columns. In such a case, two additional rows are also included in processing, and thus:

P1: R1, G1, B1
P2: R2, G2, B2
P3: R3, G3, B3
. . .
P21: R21, G21, B21
P22: R22, G22, B22

The first pixel for each column is:

$R1'=(\frac{3}{4})Red(P2)+(\frac{1}{4})Red(P3)$ $G1'=Green(P2)$ $B1'=(\frac{3}{4})Blue(P2)+(\frac{1}{4})Blue(P1)$ The last pixel for each column is:

$R20'=(\frac{3}{4})Red(P21)+(\frac{1}{4})Red(P22)$ $G20'=Green(P21)$ $B20'=(\frac{3}{4})Blue(P21)+(\frac{1}{4})Blue(P20)$ By bringing in the pixel data with one color shifted by a single pixel, only one additional line is read in:
1': R2, G1, B1
2': R3, G2, B2
1': R4, G3, B3
20': R21, G20, B20
21': R22, G21, B21
Then the resulting first pixel for each column is:
R1'=(¾)Red(P1)+(¼)Red(P2)
G1'=Green(P2)
B1'=(¾)Blue(P2)+(¼)Blue(P1)
And the last pixel in each column is:
R20'=(¾)Red(P20)+(¼)Red(P21)
G20'=Green(P21)
B20'=(¾)Blue(P21)+(¼)Blue(P20)

Note that this is but one way in which to perform method 700 of FIG. 7. Processing images in other manners, including by whole rows rather than columns or by images received in formats other than pixels, are contemplated by the techniques described herein.

System-on-Chip

Figure 8:
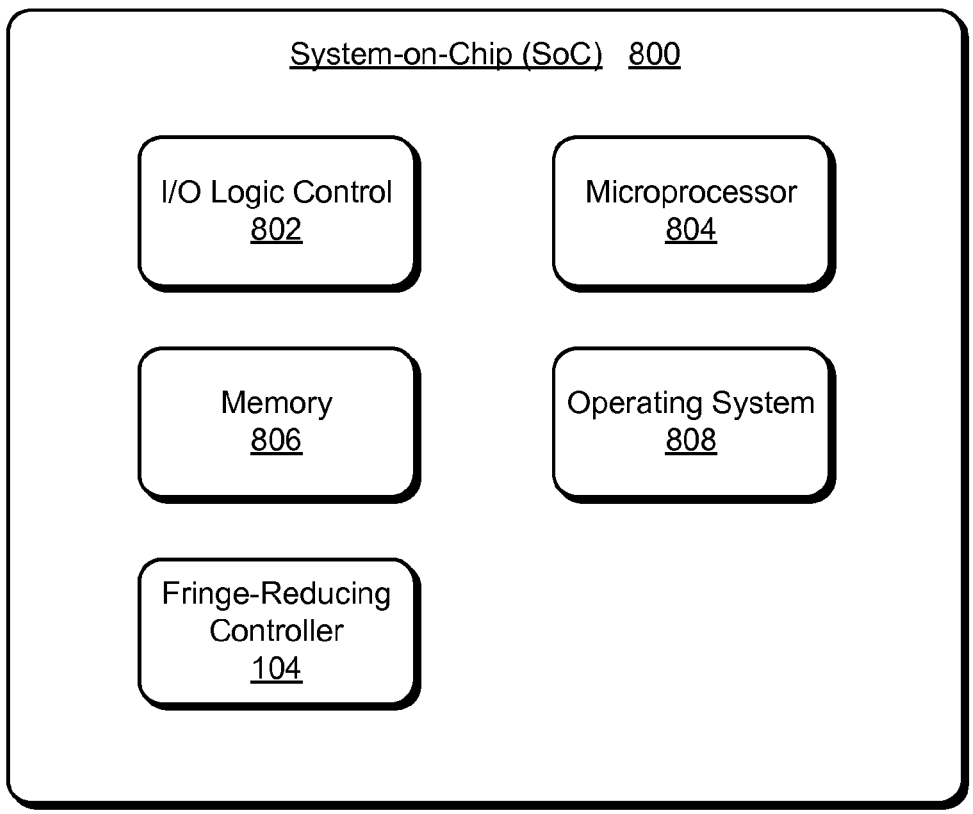
FIG. 8 illustrates a System-on-Chip (SoC) environment for implementing embodiments of the techniques described herein.

FIG. 8 illustrates a System-on-Chip (SoC) 800, which can implement various embodiments described above. An SoC can be implemented in a fixed or mobile device of various types. SoC 800 can be integrated with electronic circuitry, a microprocessor, memory, input-output (I/O) logic control, communication interfaces and components, other hardware, firmware, and/or software needed to run an entire device (e.g., CIS device 102). SoC 800 can also include an integrated data bus (not shown) that couples the various components of the SoC for data communication between the components. A device that includes SoC 800 can also be implemented with many combinations of differing components.

In this example, SoC 800 includes various components such as an input-output (I/O) logic control 802 (e.g., to include electronic circuitry) and a microprocessor 804 (e.g., any of a microcontroller or digital signal processor). SoC 800 also includes a memory 806, which can be any type of random access memory (RAM), a low-latency nonvolatile memory (e.g., flash memory), read only memory (ROM), and/or other suitable electronic data storage. SoC 800 can also include various firmware and/or software, such as an operating system 808, which can be computer-executable instructions maintained by memory 806 and executed by microprocessor 804. SoC 800 can also include other various communication interfaces and components, wireless LAN (WLAN) or PAN (WPAN) components, other hardware, firmware, and/or software.

SoC 800 includes fringe-reducing controller 104, which may include various components of FIG. 2 as well. Fringe-reducing controller 104 in SoC 800, either independently or in combination with other entities, can be implemented as computer-executable instructions maintained by memory 806 and executed by microprocessor 804 to implement various embodiments and/or features described herein, such as reducing color fringes. Fringe-reducing controller 104 may also be provided integral with other entities of the SoC. Alternatively or additionally, fringe-reducing controller 104 and the other components can be implemented as hardware, firmware, fixed logic circuitry, or any combination thereof that is implemented in connection with the I/O logic control 802 and/or other signal processing and control circuits of SoC 800.

Although the subject matter has been described in language specific to structural features and/or methodological operations, the subject matter defined in the appended claims is not necessarily limited to the specific features or operations described above, including orders in which the operations are performed.

What is claimed is:

1. A controller configured to control an illuminator of a contact-image sensor (CIS) device having sensors and the illuminator, wherein the illuminator is capable of illumination with three colors, wherein the sensors are capable of capturing images, and wherein the controller is configured to:
   cause the illuminator to:
      illuminate media with an outer color of the three colors, the outer color illuminating the media for a first period less than a fraction of a scan period, the fraction being the scan period divided by a number of the three colors, the scan period being in which a scan line is scanned by the CIS device based on a relative movement between the media and the sensors used to scan the scan line; and
      illuminate the media with a middle color of the three colors, the middle color temporally proximate to illuminating the media with the outer color, the illumination effective to enable the sensors to capture images of the media.

2. The controller of claim 1, wherein causing the illuminator to illuminate media with the outer color is performed after causing the illuminator to illuminate media with the middle color.

3. The controller of claim 1, the controller further configured to cause the illuminator to illuminate the media with a second outer color for a third period, wherein illuminating the media with the middle color is for a second period, and the first period and the third period correspond to captured outside images of the captured images captured by the sensors and the second period corresponds to a captured middle image of the captured images captured by the sensors, and wherein the controller causes a pre-processor to:
   align the outside images with the middle image to provide a composite image having a color fringe;
   blur the middle image of the composite image effective to reduce the color fringe present in the composite image; and
   sharpen the composite image to reduce blurring of the composite image.

4. The controller of claim 1, wherein causing the illuminator to illuminate media with the middle color is for a second period equal to or greater than the fraction.

5. The controller of claim 1, wherein the fraction of the scan period is ⅓.

6. The controller of claim 1, wherein the illuminator is capable of illumination with more than three colors, two of the colors being outer colors and two or more of the colors being middle colors.

7. The controller of claim 6, wherein the controller is further configured to cause the illuminator to: illuminate the media with a second of the two or more middle colors and a second outer color effective to enable the sensors to capture four images of the media.

8. A method comprising:
   illuminating media with a first color for a first period less than one third of a scan period in which a scan line is scanned by a contact-image sensor (CIS) device, the scan period being based on a relative movement between the media and sensors of the CIS device that are used to scan the scan line;
   illuminating the media with a second color temporally proximate to illuminating the media with the first color, the temporal proximity of the illuminating with the first color and the illuminating with the second color being smaller than one third of the scan period; and
   providing images to a computing device, the images captured through the illuminating the media with the first color and the illuminating the media with the second color, the images capable of being aligned to create a composite image.

9. The method of claim 8, further comprising:
   illuminating the media with a third color temporally proximate to illuminating the media with the second color, the temporal proximity of the illuminating with the third color and the illuminating with the second color being smaller than one third of the scan period.

10. The method of claim 9, wherein illuminating the media with the second color is for a second period equal to about one-third of the scan period.

11. The method of claim 9, wherein:
    the illuminating the media with the second color is for a second period and the illuminating the media with the third color is for a third period;
    the first period and the third period correspond to captured outside images of the captured images captured by the sensors;
    the second period corresponds to a captured middle image of the captured images captured by the sensors; and
    the method further comprises:
       aligning the outside images with the middle image to provide a composite image having a color fringe,
       blurring the middle image of the composite image effective to reduce the color fringe present in the composite image, and
       sharpening the composite image to reduce blurring of the composite image.

12. The method of claim 9, wherein the first color is red, the second color is green, and the third color is blue.

13. The method of claim 9, wherein the captured images are effective to reduce a first color fringe caused by a white-to-black color transition in the scan line by 25 or more percent over illuminating with the first, the second, and the third colors each for one-third of the scan period.

14. A method comprising:
    receiving three images at a computing device, the three images captured of scanned media, a composite image of the three images having a color fringe;
    blurring a middle image of the three images, the three images having two outside images and the middle image, the blurring of the middle image reducing the color fringe present in the composite image having the blurred, middle image aligned with the two outside images but increasing a blurring of the composite image;
    sharpening the composite image to reduce the blurring of the composite image effective to create a sharpened, composite image; and
    providing the sharpened, composite image.

15. The method of claim 14, wherein the three images correspond to misaligned regions of a scan line, the misalignment caused by a relative speed of movement between the scanned media when the scanned media is being scanned and sensors scanning the scanned media.

16. The method of claim 14, further comprising aligning the two outside images with the middle image to create the composite image.

17. The method of claim 16, wherein aligning the two outside images blurs the outside images and blurring the middle image blurs the middle image an amount about equal to the blurring of the outside images caused by aligning the two outside images.

18. The method of claim 14, wherein a first of the two outside images is offset from the middle image by a first line-color spacing and a second of the two outside images is offset from the middle image by a second line-color spacing, and wherein aligning the two outside images shifts the first outside image by the first line-color spacing and shifts the second outside image by the second line-color spacing.

19. The method of claim 18, wherein the first line-color spacing or the second line-color spacing is less than one-third of a scan line, the scan line corresponding to a relative speed of movement between the scanned media being scanned and sensors scanning the scanned media.

20. The method of claim 19, wherein the first line-color spacing and the second line-color spacing is equal to or less than one-quarter of the scan line.

* * * * *